US010642912B2

(12) United States Patent
Verma et al.

(10) Patent No.: US 10,642,912 B2
(45) Date of Patent: May 5, 2020

(54) CONTROL OF DOCUMENT SIMILARITY DETERMINATIONS BY RESPECTIVE NODES OF A PLURALITY OF COMPUTING DEVICES

(71) Applicant: Adobe Inc., San Jose, CA (US)

(72) Inventors: Anshul Verma, San Francisco, CA (US); Kenneth G. Russell, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 451 days.

(21) Appl. No.: 15/239,521

(22) Filed: Aug. 17, 2016

(65) Prior Publication Data

US 2018/0052933 A1  Feb. 22, 2018

(51) Int. Cl.
*G06F 16/9535* (2019.01)
*G06Q 50/00* (2012.01)

(52) U.S. Cl.
CPC ......... *G06F 16/9535* (2019.01); *G06Q 50/01* (2013.01)

(58) Field of Classification Search
CPC .......................... G06F 17/30867; G06Q 50/01
See application file for complete search history.

(56) References Cited

U.S. PATENT DOCUMENTS

| | | | | |
|---|---|---|---|---|
| 9,386,037 B1* | 7/2016 | Hunt | ................... | H04L 63/1483 |
| 2005/0138067 A1* | 6/2005 | Billsus | .............. | G06F 17/30719 |
| 2010/0169343 A1* | 7/2010 | Kenedy | ............. | G06F 17/30867 |
| | | | | 707/758 |
| 2010/0223276 A1* | 9/2010 | Al-Shameri | ...... | G06F 17/30333 |
| | | | | 707/769 |
| 2013/0212192 A1* | 8/2013 | Yerli | ....................... | H04L 51/32 |
| | | | | 709/206 |
| 2013/0232129 A1* | 9/2013 | Cheng | ................. | G06F 16/3338 |
| | | | | 707/706 |
| 2015/0331953 A1* | 11/2015 | Shen | ................. | G06F 17/30864 |
| | | | | 707/706 |
| 2016/0094477 A1* | 3/2016 | Bai | ....................... | H04L 47/786 |
| | | | | 709/226 |

* cited by examiner

*Primary Examiner* — Boris Gorney
*Assistant Examiner* — Vaishali Shah
(74) *Attorney, Agent, or Firm* — SBMC

(57) ABSTRACT

Techniques and systems are described to control a determination of document similarity. In one example, dimensionality of the documents is reduced through computation of a signature, e.g., via a hashing technique such as "minhashing" which is also known as min-wise independent permutations locality sensitive hashing. From these signatures, another hashing technique (e.g., locality sensitive hashing) is used to determine similarity of the signatures to each other. Identification of disjoint sets is then used as a basis to partition the documents for determination of document similarity by respective nodes of a plurality of computing devices. In this way, an amount of data shuffling between the nodes as part of the determination of document similarity may be reduced. In another example, a weighting is applied to attributes of documents as part of the determination of document similarity.

20 Claims, 7 Drawing Sheets

CONTROL OF DOCUMENT SIMILARITY DETERMINATIONS BY RESPECTIVE NODES OF A PLURALITY OF COMPUTING DEVICES

BACKGROUND

Determination of document similarity by computing devices is used to support a variety of functionality. In a recommendation scenario, for instance, location of a document by a computing device describing a product or service that has been purchased by a user may be used by the computing device to locate similar documents describing similar products or services. Similarity of these documents (e.g., product or service descriptions) may then be used as basis to form recommendations by the computing device for the user, such as to recommend one news article based on the content of another news article with which the user has interacted. Similar techniques may be used in marketing scenarios by the computing device to suggest similar advertisements, find related items in a search context, locate similar social network communications, and so forth. Thus, the uses for determinations of document similarity by a computing device may vary as greatly as what is described by the documents.

Conventional techniques used to determine document similarity are computing resource intensive, which limits availability of these techniques. In one conventional technique, a brute force approach is used by computing devices in which each document is compared to each other document to determine similarity. Therefore, even in instances of one thousand documents, time complexity of such an approach is in the order of a million operations by the computing devices. This may be further complicated by the sparsity of data exhibited by the documents since each document typically includes relatively few of the billions of available words in a human language. Therefore, comparison of each of the available words as part of the billions of available words may consume a significant amount of resources of the computing devices. In instances of one hundred thousand documents, for instance, a forty node cluster of computing devices may take approximately six hours to compute similarity of the documents to each other. Since the time complexity is quadratic based on the number of documents, this run time may quickly increase to days for document comparisons of even larger libraries of documents, such as descriptions of games and movies that may exceed millions of documents in typical online scenarios.

SUMMARY

Techniques and systems are described to control a determination of document similarity. In one example, dimensionality of the documents is reduced through computation of signature data by a computing device, e.g., via a hashing technique such as "minhashing" which is also known as min-wise independent permutations locality sensitive hashing.

From this signature data, another hashing technique (e.g., locality sensitive hashing) is used to determine similarity of the signature data to each other, such as by hashing values of the signature data into respective buckets, e.g., collections of similar signatures. Identification of disjoint sets of data is then used as a basis to partition the documents for determination of document similarity by respective nodes of a plurality of computing devices. In this way, an amount of data shuffling between the nodes of the computing devices as part of the determination of document similarity may be reduced. In another example, a weighting is applied by the computing device to attributes of documents as part of the determination of document similarity, e.g., to apply different weights to actors than directions for documents that describe movies.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
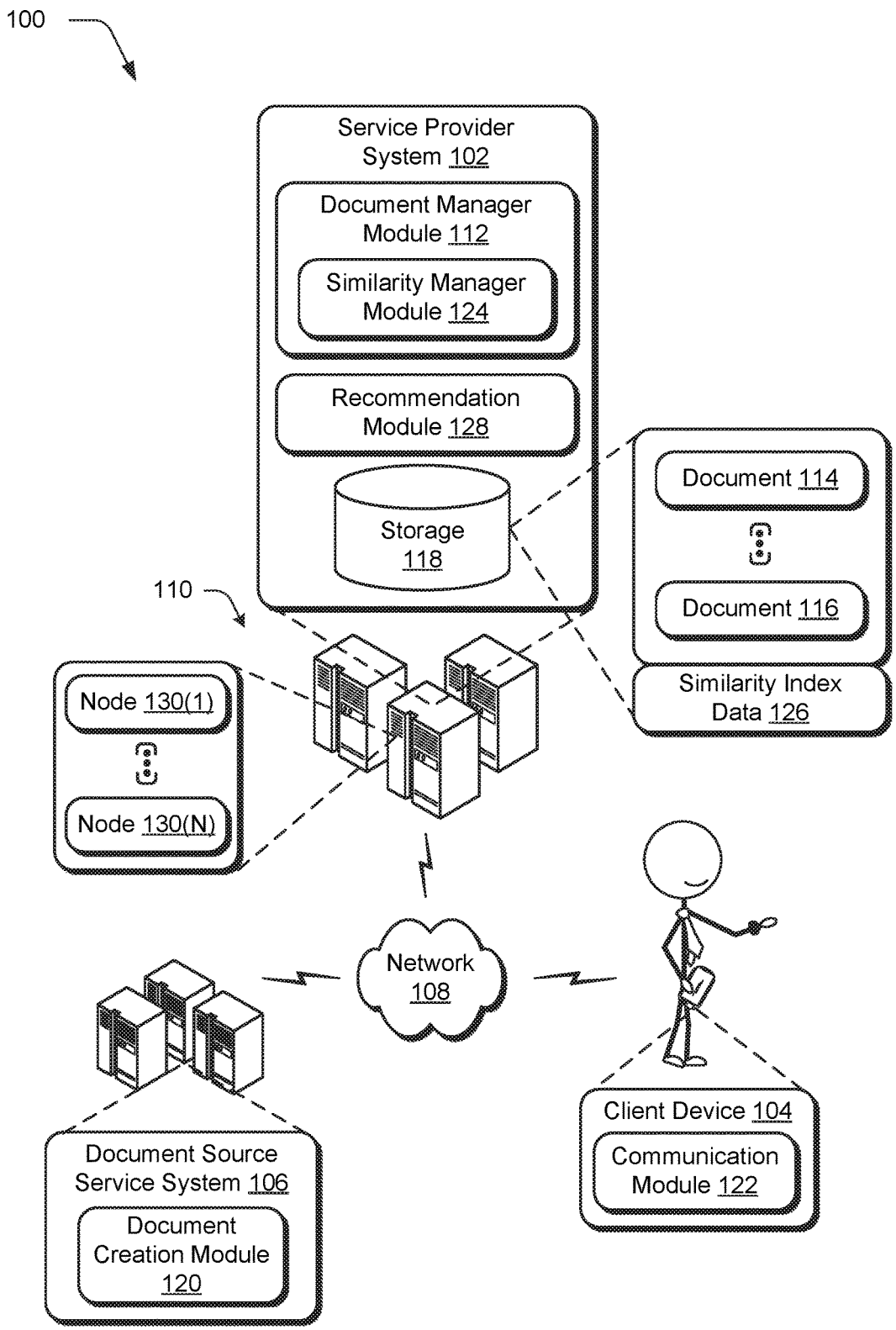
FIG. 1 is an illustration of an environment in an example implementation that is operable to employ techniques described herein.

Determination of similarity of documents by a computing device (e.g., digital or electronic documents) is a computationally expensive operation, especially when confronted with highly sparse data included in a multitude of documents. There are two main factors that contribute to this inefficiency in conventional techniques, which are size and dimensionality. Size refers to a number of items that are included in a corpus, i.e., the number of documents. Dimensionality refers a number of different elements included in each of the documents, e.g., known words in a language. Accordingly, comparison of a large number of elements (e.g., words) in a large number of documents may cause consumption of significant amounts of computing resources, e.g., even up to days of processing for large online repositories of songs, application stores, social network posts, and so forth.

Accordingly, techniques and systems are described to control a determination of document similarity by nodes of a plurality of computing devices. In one example, dimensionality of the documents that are stored electronically (e.g., digital documents) is reduced by a computing device through computation of signature data from the documents, e.g., via a hashing technique such as "minhashing" which is also known as min-wise independent permutations locality sensitive hashing. This works to reduce the dimensionality of the dataset (i.e., randomness of variables in the dataset) formed by the documents while retaining information used to calculate similarity between underlying documents by the computing device.

From this signature data, another hashing technique (e.g., locality sensitive hashing) is used by the computing device to determine similarity of the signature data to each other, such as by hashing values of the signature data into respective buckets (e.g., ranges, collections, or clusters of similar hashes). Thus, assignment of the signature data into respective buckets may be used to determine similarity of the signature data and thus corresponding documents to each other. In one example, this is done by the computing device through use of threshold data describing a minimum number of buckets that are to be shared by respective signature data in order to be considered similar.

As previously described, because the dataset is typically sparse, this may result in formation of a plurality of disjoint sets of the signature data that are similar to each other. Accordingly, identification of these disjoint sets by the computing device may be used as a basis to partition the documents for determination of document similarity. each of these partitions may then be assigned to a respective node (e.g., computing device, virtual server node, processing core, and so forth) of a plurality of computing devices in order to determine similarity of the documents, one to another, that have been assigned to a respective node. The documents within the partitions, for instance, may be compared to each other using a brute force approach to determine document similarity.

In this way, efficiency in a determination of document similarity may be increased by reducing an amount of data shuffling between the nodes of a plurality of computing devices as part of the determination. For example, as previously described in conventional techniques each document is compared with each other document. Therefore, for a large corpus this may result in significant amounts of data transfers between nodes, which are reduced in the techniques described herein. Further, dimensionality is reduced through use of the signature data in order to form the partitions and thus further improves computational efficiency. This is done so in a manner that preserves information used to calculate similarity between underlying documents and thus also preserves accuracy in the similarity determination. Further discussion of these and other examples is included in the following sections.

In the following discussion, an example environment is first described that may employ the document similarity determination techniques described herein. Example procedures are then described which may be performed in the example environment as well as other environments. Consequently, performance of the example procedures is not limited to the example environment and the example environment is not limited to performance of the example procedures.

Key Terms

The term "document" refers to any document configured to be stored digitally. Examples of documents are webpages, digital descriptions of products or services, spreadsheets, slide presentations, digital images, digital music, multimedia files, digital movies, digital books, social network posts, and so forth.

The term "recommendation" is a suggestion or proposal regarding an item of digital content, physical product or service, and so forth. Examples of recommendations include suggestions of related digital movies, books, descriptions of physical products or services, descriptions of computer applications, and so forth.

The term "hash" refers to any function that can be used to map data to an arbitrary size of data of fixed size. An example of a hash value generated using a hash is signature data in the following. Examples of hash functions include "minhashing" and "locality sensitive hashing" (LSH). Minhashing is a technique used to reduce dimensionality of a dataset through calculation of signature data while preserving information usable to calculate similarity between underlying documents represented by the signature. LSH is used to generate a similarity graph in which documents represented by the signatures are vertices and edges that connect these vertices describe similarity of the documents, one to another. The term "bucket" refers to an interval of data to which the data is hashed, i.e., ranges or collections of signature data.

The term "dimensionality reduction" refers to a process of reducing a number of random variables under consideration, e.g., as part of a similarity determination. An example of dimensionality reduction includes feature selection and extraction.

The term "partition" is a division (i.e., portion) of a dataset. Examples of a partition include a collection or cluster of a dataset, e.g., of signature data.

The term "node" refers to a portion of processing resources of a computing device. Examples of nodes include a processor, processing core, virtual node of a server, and so forth.

The term "disjoint sets" refers to non-overlapping subsets of a dataset. Examples of techniques used to find disjoint sets include a "union find" technique.

Example Environment

FIG. 1 is an illustration of an environment 100 in an example implementation that is operable to employ document similarity determination techniques described herein. The illustrated environment 100 includes a service provider system 102, a client device 104, and a document source service system 106 that are communicatively coupled, one to another, via a network 108. These entities are implemented by computing devices that are configurable in a variety of ways. A computing device. for instance, may include a processing system having one or more processors and devices (e.g., CPUs, GPUs, microcontrollers, hardware elements, fixed logic devices, etc.), and one or more computer-readable storage media. Thus, the various modules 112, 120, 122, 124, 128, along with the storage 118, are implemented at least partially in hardware of respective computing devices (e.g., servers, personal computers) and may reside on the computer-readable storage media to be executed by the processing system. Examples of processing systems and computer-readable media can be found in the discussion of the example computing system of FIG. 7.

The processing system of the service provider system 102, for instance, may retrieve and execute computer-program instructions from the modules 112, 124, 128 of a computing device to provide a wide range of functionality, including but not limited to online application stores, document management web services, online storage, web services, digital content providers (e.g., movies, books, images), and so forth.

Example of a computing device implementing the client device 104 include a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a system formed from plurality of different devices, such as nodes 130 of a system implemented by multiple servers 110, processing cores, and so forth utilized by a business to perform operations "over the cloud" as illustrated for the service provider system 102 and further described in relation to FIG. 7.

The service provider system 102 is illustrated as including a document manager module 112. The document manager module 112 is implemented at least partially in hardware of a computing device to manage collection, storage, and communication of documents 114, 116 that are storable electronically or digitally in storage 118 associated the service provider system 102. The documents 114, 116 may describe a variety of information.

In one example, the documents 114, 116 are obtained from a document source service system 106. The document source service system 108 includes a document creation module 120 implemented at least partially in hardware of a computing device (e.g., processing system and memory) to create the documents 114, 116 in order to support online services. The documents 114, 116, for instance, may describe music, videos, games, and other digital content that is made available to a user of a client device 104, e.g., through a network-enabled application or browser represented by a communication module 122. In another example, the client device 104 is used to access the document source service system 106 to create a social network communication (e.g., post) which is then shared with family and friends of a user of the client device 104. Other examples are also contemplated, such as textual descriptions of digital images, online articles, webpages, and any other textual expression that is storable by a computer-readable storage medium. Thus, the documents 114, 116 may assume a wide variety of configurations.

The document manager module 112 is further illustrated as including a similarity manager module 124. The similarity manager module 124 is implemented at least partially in hardware of at least one computing device to determine similarity of the documents 114, 116 to each other. This similarity may be expressed through use of similarity index data 126 as further described in the following. A determination of similarity is usable to support a variety of different functionality. An example of this is to recommend items of digital content to be exposed to a user through use of a recommendation module 128 that is implemented at least partially in hardware of a computing device, e.g., advertisements, other products or services, and so forth.

A determination of document similarity in highly sparse (e.g., billions of words) and massive (e.g., millions of documents) datasets is a computationally expensive operation. Accordingly, the document manager module 112 is configured to employ techniques to increase computational efficiency in performance of these operations by nodes 130 of a computing device (e.g., servers 110), thereby reducing an amount of time used to perform the operations and corresponding consumption of resources.

As part of this, the document manager module 112 is configured to employ techniques to reduce dimensionality of the set of documents 114, 116 and increase efficiency in a determination of similarity of this set of documents 114, 116. One example of this includes "minhashing" and "locality sensitive hashing" (LSH), although other techniques are also contemplated in the following. Minhashing is a technique used by the document manger module 112 to reduce dimensionality of a dataset through calculation of signature data (i.e., a signature) while preserving information usable to calculate similarity between underlying documents represented by the signature data. LSH is used to generate a similarity graph in which documents represented by the signatures are vertices and edges that connect these vertices describe similarity of the documents, one to another.

The similarity graph that is generated is then partitioned to reduce shuffling of data over a network. The similarity manager module 124, for instance, may be implemented at least partially in hardware of a computing device to form partitions of similar documents through identification of disjoint sets of data in the similarity graph, i.e., sets of the documents that are not similar to other sets of the documents, but are similar to each other. Partitions formed from these disjoint sets are then assigned to respective ones of a plurality of nodes 130(1)-130(N) implemented by the plurality of computing devices 110, e.g., processing cores, individual server, virtual instances of servers, and so forth. A brute force approach is then used to determine similarity of documents to each other within these partitions, and thus reduces communication of data between the nodes 130(1)-130(N). In this way, efficiency of the plurality of nodes 130(1)-130(N) in determining similarity of the documents may be improved by reducing an amount of data transfer between nodes.

Through use of these approaches, the time taken to compute the similarity index may be made independent of both size and dimension of the dataset. Techniques may also be employed by the similarity manager module 124 to selectively weight attributes of documents differently, e.g., to weight similarity of directors over actors in documents describing movies. Further discussion of these are other examples are described in the following.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Determination of Document Similarity

Figure 2:
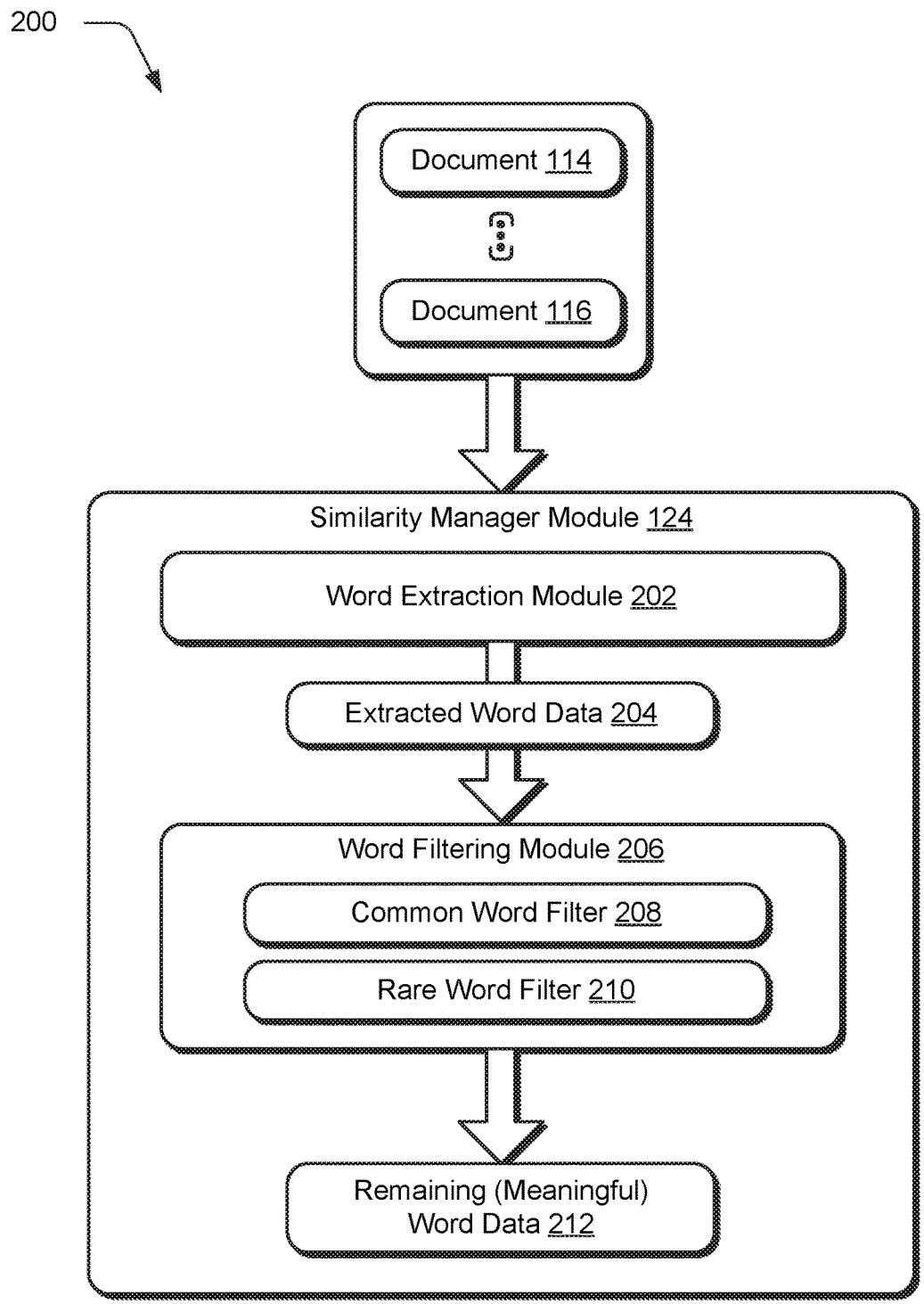
FIG. 2 depicts a system in an example implementation in which meaningful words are filtered from documents by a computing device for use in determination of document similarity.

FIG. 2 depicts a system 200 in an example implementation which meaningful word data is filtered from documents for use in determination of document similarity. To begin, documents 114, 116 are received by the similarity manager module 124. The documents 114, 116 are representative of a plurality of documents, including hundreds, thousands, and even millions of documents. As previously described, the documents 114, 116 may describe a variety of different ideas, such as products and services, webpages, social network communications, and so forth.

A word extraction module 202 is configured at least partially in hardware to extract word data 204 from the documents 114, 116. The word data 204, for instance, may correspond to words in a human language, computing language, or any other individual textual description.

The extracted word data 204 is then processed by a word filtering module 206. The word filtering module 206 is configured at least partially in hardware of a computing device to keep meaningful word data 212 from the extracted word data 204. The word filtering module 206, for instance, may include a common word filter 208 implemented in software of a computing device that is configured to remove common word data (and stop words) from the extracted word data 204. The common words filter 208, for instance, may include a list of words that have a minimal likelihood of contributing to expression of an idea behind a respective document. Examples of common words include "the," "I," and so forth.

In another instance, the word filtering module 206 includes a rare word filter 210 that is implemented at least partially in hardware of a computing device. The rare word filter 210 includes a list of words that have a minimal likelihood of being included in respective documents and thus have a minimal likelihood of contributing to a determination of similarity of two documents. The list of rare words, for instance, may be configured based on ideas likely to be expressed in the documents 114, 116, such as actor names in a list of movie descriptions. A variety of other types of filtering may also be employed to arrive at a list of remaining (meaningful) word data 212, i.e., words that are likely to contribute to a determination of document similarity as further described in the following.

Figure 3:
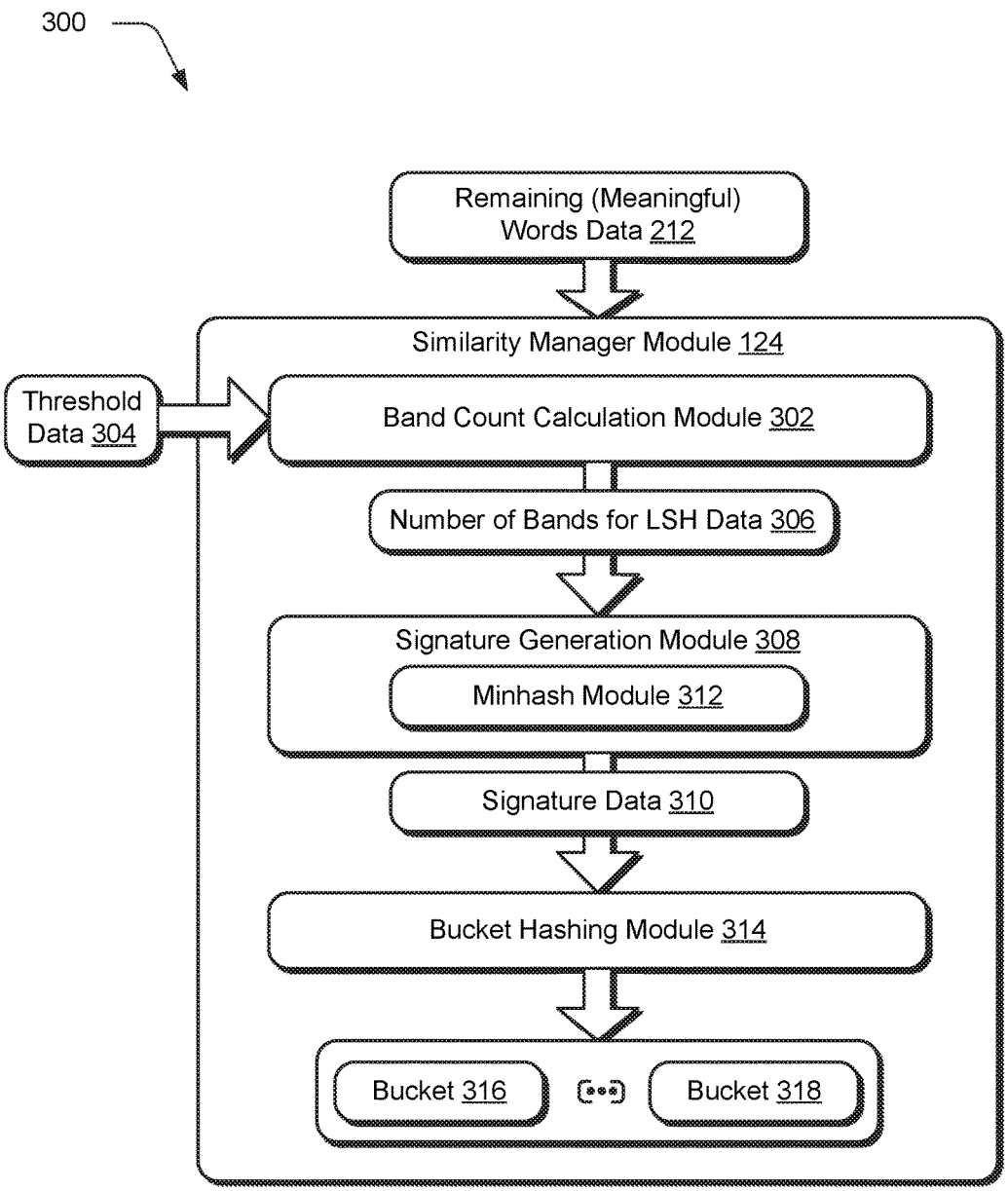
FIG. 3 depicts a system in an example implementation in which an initial document similarity determination is made by a computing device from signature data computed from the documents.

FIG. 3 depicts a system 300 in an example implementation in which an initial document similarity determination is made from signatures computed from the documents. A band count calculation module 302 is included in this example as implemented at least partially in hardware of a computing device to calculate a minimum number of bands used as part of a locality-sensitive hashing (LSH) 306 to pre-filter similar pairs using threshold data 304 as further described below.

In one example, the optimal number of bands required is calculated to find each pairs of the document which are similar to each other above a predetermined threshold $s_{min}$. This can also be termed as "minimum desired similarity" as it controls what pairs end up in the similarity graph discussed below. Then, an approximation factor is assigned which dictates a desired closeness to $s_{min}$. This is referred to as a "similarity margin" and denoted by $\in$. Putting this together, the band count "b" may be calculated as follows.

$$b = \frac{\log(1 - \in)}{\log(1 - s_{min}^r)}$$

Here band size "r" is known as an input to the algorithm. The value of "$\in$" is expected to fall between $1e^{-3}$ and $1e^{-6}$ for good results.

In the illustrated example, threshold data 304 is received as an input. The threshold data 304 may be specified manually by a user, predefined automatically, and so forth. The threshold data 304 defines a minimum amount of similarity used to define which of the documents 116, 118 are considered similar to each other.

Using the threshold data 304, a minimum number of buckets (data values) is calculated in which two documents are to be hashed together into to become candidate pairs in a similarity graph.

A signature generation module 308 implemented at least partially in hardware of a computing device is then employed to generate signature data 310 for the documents from the remaining meaningful word data 212 included in the documents. The signature data 310 is configured to reduce dimensionality (e.g., number of words) of the remaining word data 212 yet still preserve characteristics usable to determine similarity of the documents, preliminarily, based on the signature data 310. An example of this is represented as a minhash module 312 that is implemented at least partially in hardware to employ a minhash technique. A minhash technique, also referred to as min-wise independent permutations locality sensitive hashing scheme, employs a random set of hash functions (e.g., each corresponding to a respective value of the signature data 310) to generate a unique signature of the document. This signature data 310 is usable to estimate how similar corresponding documents represented by the signatures are to each other.

The signature data 310 is then communicated to a bucket hashing module 314. The bucket hashing module 314 is implemented at least partially in hardware of a computing device to hash the signature data 310 for inclusion in respective buckets, e.g., using a LSH technique to assign to particular data sets. Using this technique, the signature data 310 (and thus corresponding documents 114, 116) may be assigned to respective buckets and combinations of the buckets, and from this similarity of the signature data 310 may be determined as further described in the following.

Figure 4:
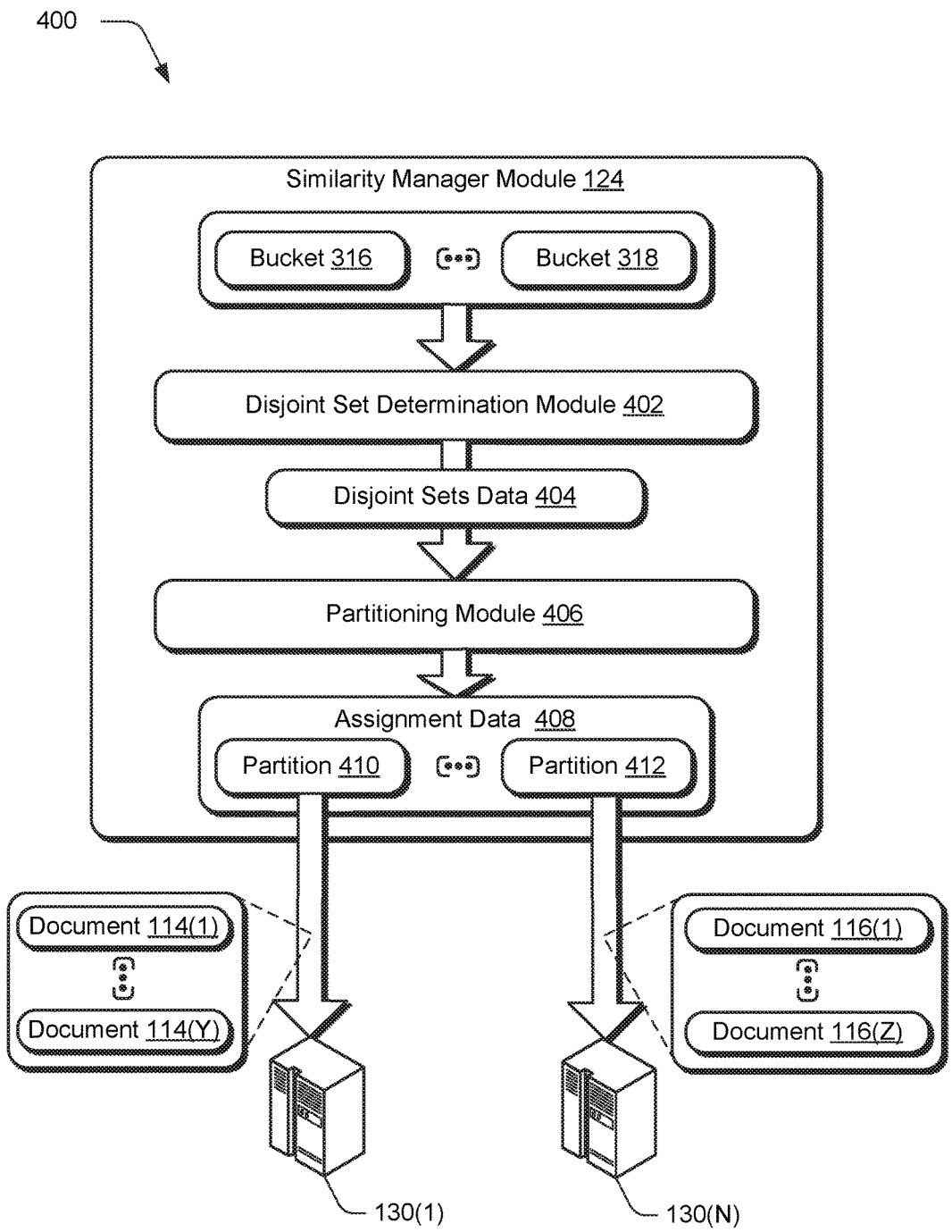
FIG. 4 depicts a system in an example implementation in which the initial document similarity determination of FIG. 3 is used by a computing device to partition documents to determine similarity, one to another, within the partitions.

FIG. 4 depicts a system 400 in an example implementation in which the initial document similarity determination of FIG. 3 is used to partition documents to determine similarity, one to another, within the partitions. In this example, a disjoint set determination module 402 implemented at least partially in hardware of a computing device receives the bucket 316, 318 assignments of the signature data 310 of FIG. 3. This forms a similarity graph in which the vertices refer to individual ones of the signature data 310 and the edges define similarity between respective vertices, e.g., the signature data 310 and thus the corresponding documents 116, 118.

The similarities in this instance are defined by a number of buckets corresponding signature data 310 is "hashed into." The bucket hashing module 314, for instance, may use a hundred buckets. Membership in individual ones of the buckets, as a result of a hashing operation of the signature data 310, is then used to determine which documents are similar to each other. This may be determined in a variety of ways, such as through use of a Jacarrd similarity coefficient, Cosine distance, Hamming distance, and so forth. In this way, a similarity graph is formed in data in which vertices represent documents and edges represent similarity of respective documents to each other. In one implementation, the similarity graph is "pruned" by the similarity manager module 124 by removing connections between signature data that does not have at least a minimal number of matching buckets, i.e., a minimum amount of similarity.

From this, the disjoint set determination module 402 is implemented at least partially in hardware to determine disjoint sets 404 of the signature data 310 and from this clusters of corresponding documents 116, 118. Continuing with the previous example, the similarity graph may be highly disjoint due to sparsity of the documents, e.g., words included in the documents from the billions of available words. In a real world implementation, a largest disjoint set of a corpus of 2.5 million documents having a minimum similarity threshold included a few thousand documents. A variety of techniques may be employed to locate these disjoint sets, such as a find-union technique.

The disjoint sets 404 are then provided to a partitioning module 406. The partitioning module 406 is implemented at least partially in hardware of a computing device to generate assignments 408 of partitions 410, 412 of the documents 116, 118 to be used to determine document similarity based on the disjoint set data 404. As previously described, the disjoint set data 404 defines both similarity of a cluster of signature data 310, and thus correspondence of documents to each other as well as dissimilarity of this cluster of signature data 310 to other clusters.

Accordingly, the partitioning module 406 may leverage this to assign documents for processing by respective nodes 130(1), ..., 130(N) of computing devices (e.g., servers) from respective partitions 410, 412 by generating assignment data 408. As previously described, a brute force approach is then employed by the individual nodes 130(1)-130(N) to calculate similarity of the documents of the nodes to each other within the partitions. Since the similarities are calculated separately for each partition, the calculation may be efficiently parallelized. In this way, an amount of communication between nodes 130(1)-130(N) is reduced, thereby improving efficiency in the document similarity determination.

In one example, once a similarity graph is built, each edge between two documents contains a weight which indicates how many times those documents were hashed to the same bucket as described above. This value is denoted by $w_{i,j}$ in the following, where "i" and "j" are the two documents connected by this edge.

Due to the probabilistic nature of the LSH algorithm, some of the edges in the similarity graph might be between two documents whose similarity score is lower than desired. If this is the case, these edges may be removed before proceeding to the next step. Since, the minimum desired similarity $s_{min}$ is known, this may be used as a basis to determine the minimum weight required for an edge to remain, i.e., not get deleted. This is called bucketization threshold and is denoted by $t_b$ in the following equation.

$$t_b = \sum_{i=1}^{b} i \binom{b}{i}(1-s^r)^{b-i}s^{ri}$$

As described above, the number of bands (denoted by b) and the size of each band used in the LSH algorithm are known. Using this information, an approximate similarity "s" is calculated between documents "i" and "j" using the following equation.

$$s_{i,j} = \left(\frac{w_{i,j}}{b}\right)^{\frac{1}{r}}$$

This value can be made as close as possible to the true Jaccard similarity S by increasing "b" and "r" as high as possible while still making sure the process requires reasonable memory to store each of the bands. The difference between the true Jaccard similarity "S" and its approximation "s" for a document pair "i" and "j" is the approximation error for that pair of documents.

$$\Delta_{i,j} = S_{i,j} - s_{i,j}$$

As shown the following equation, this difference may be determined by first calculating the actual Jaccard similarity as per the first equation above, then subtracting from it the approximated value. Due to the probabilistic nature of the algorithm, this error can vary. This may be reduced by controlling band size and band count as preformed above. To calculate the total error "E" in approximation, a Root Mean Square formula may be used as follows.

$$E = \sqrt{\frac{\sum_{i=1}^{n}\sum_{j=1}^{n}(S_{i,j}-s_{i,j})^2}{n^2}}$$

Further discussion of this and other examples is described in the following section.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
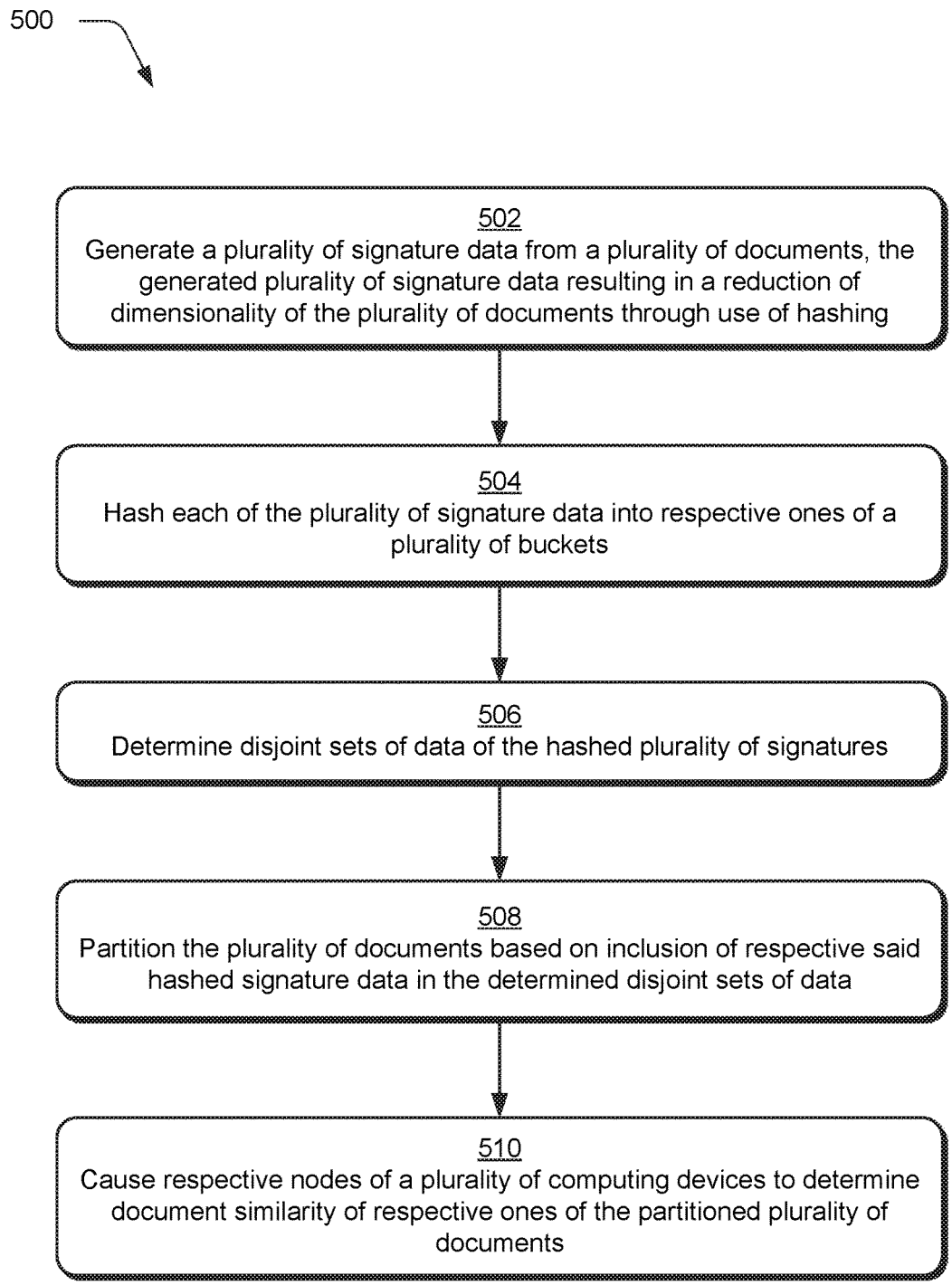
FIG. 5 is a flow diagram depicting a procedure in an example implementation in which document similarity determinations are controlled by a computing device.

FIG. 5 depicts a procedure 500 in an example implementation in which document similarity determinations are controlled. A plurality of signature data is generated from a plurality of documents. The generated plurality of signature data results in a reduction of dimensionality of the plurality of documents through use of hashing (block 502). A reduction in dimensionality may be performed in a variety of way, such as through a minhash technique by the signature generation module 308 in which a collection of different hashing techniques is used to generate different individual values of the signature data that together form the signature data that is used to describe a respective document.

Each of the plurality of signature data is hashed into respective ones of a plurality of buckets (block 504). The bucket hashing module 314, for instance, may hash the signature data generated by the signature generation module 308 into respective buckets, e.g., through use of an LSH technique. This may then be used to determine which signature data has a threshold amount of similarity, one to another, as defined based on inclusion together in at least a minimum number of buckets. This may be used to form a similarity graph as previously described.

Disjoint set data of the hashed plurality of signatures are then determined (block 506). A disjoint set determination module 402, for instance, may determine sets of signature data that collectively are similar, one to another, but form a disjoint set of data in relation to other hashed signature data based on inclusion in buckets as described above. The plurality of documents is partitioned based on inclusion of respective hashed signature data in the determined disjoint sets (block 508), e.g., to form partitions 410, 412 that include one or more disjoint sets of data 404. Respective nodes of a plurality of computing devices are then caused to determine document similarity of respective ones of the partitioned plurality of documents (block 510). This may be performed via a brute force technique in which each document is compared to each other document within a partition. In this way, communication between nodes may be minimized, thereby improving efficiency of the similarity determination.

Figure 6:
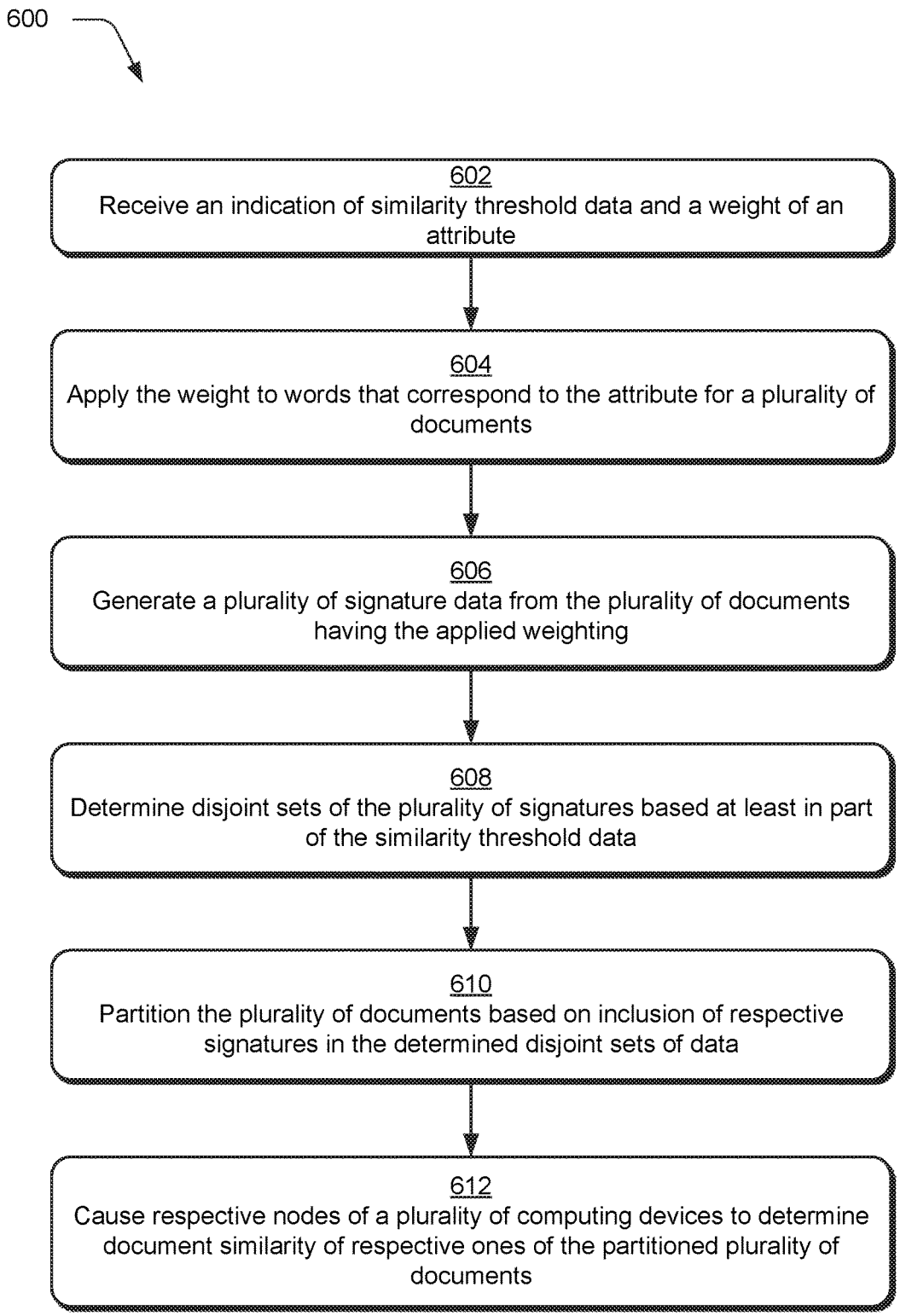
FIG. 6 is a flow diagram depicting a procedure in an example implementation in which weighting is applied as part of a document similarity determination by a computing device.

FIG. 6 depicts a procedure 600 in an example implementation in which weighting is applied as part of a document similarity determination. An indication is received of a similarity threshold data and a weight of an attribute (block 602). A user, for instance, may manually specify a minimum amount of similarity to be used in the determination of document similarity via similarity threshold data. A weight of an attribute may also be user specified, e.g., to weight actors over directors when determining similarity of films based on respective documents that describe the films.

The weight is applied to words that correspond to the attribute for a plurality of documents (block 604), e.g., stored digitally. Continuing with the previous example, words that correspond with the attribute (e.g., actors) are multiplied by the weight and included in the documents. In this way, different weights may be readily applied in an efficient manner without disrupting the determination of document similarity described above.

Accordingly, a plurality of signature data is generated from the plurality of documents having the applied weighting (block 606). Disjoint sets are determined of the plurality of signature data based at least in part of the similarity threshold data (block 608). The plurality of documents is partitioned based on inclusion of respective said signature data in the determined disjoint sets of data (block 610) and respective nodes of a plurality of computing devices are caused to determine document similarity of respective ones of the partitioned plurality of documents (block 612).

Example System and Device

Figure 7:
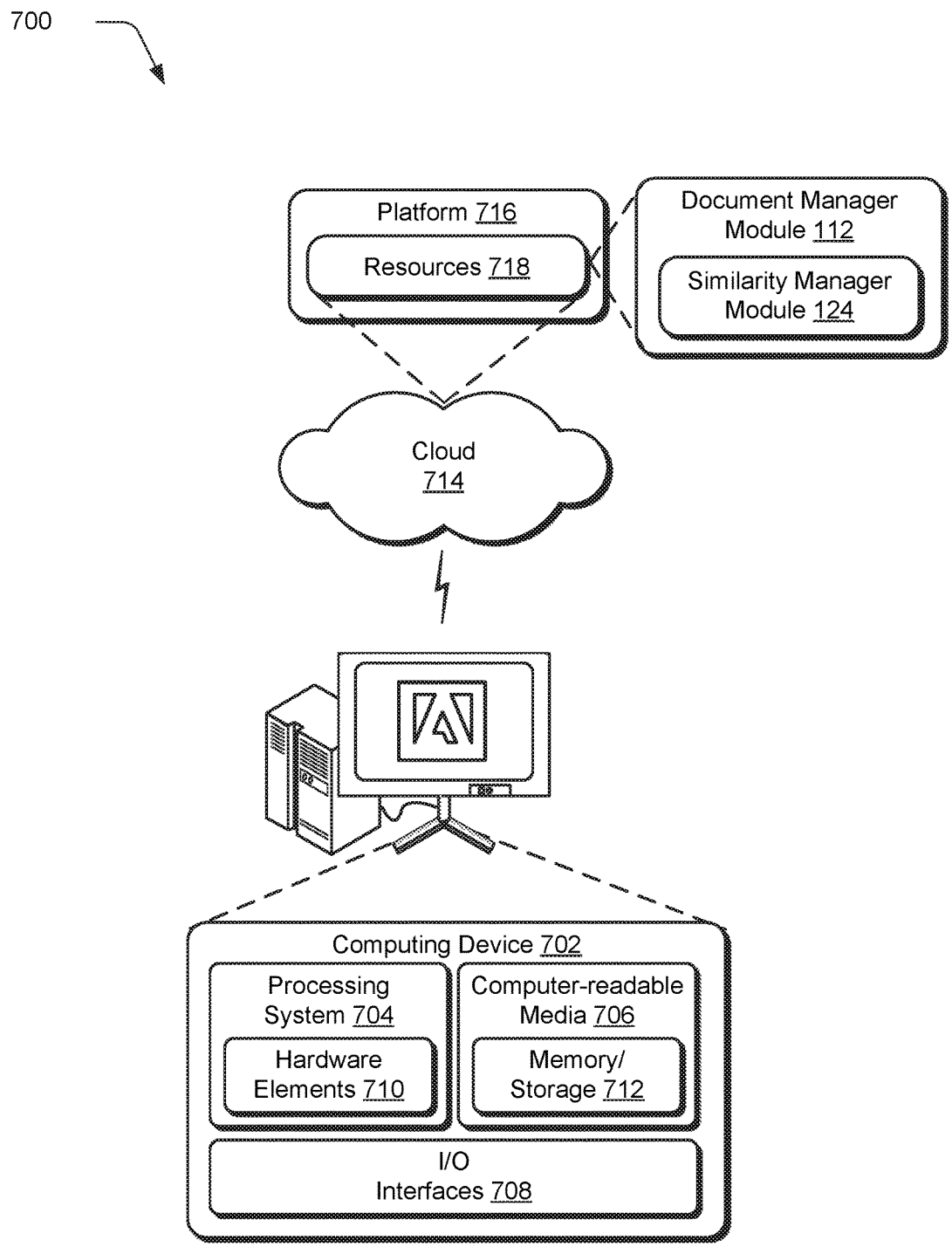
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the document manager module 112 and similarity manager module 124. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to determine document similarity of a plurality of documents, a method implemented by at least one computing device, the method comprising:
   receiving, by the at least one computing device, an input specifying a similarity threshold, the similarity threshold defining a minimum number of a plurality of buckets that two said documents are both to be included in to be considered similar;
   generating, by the at least one computing device, a plurality of signature data from the plurality of documents using hashing, the plurality of signature data resulting in a reduction of dimensionality of the plurality of documents;
   hashing, by the at least one computing device, the plurality of documents into respective ones of the plurality of buckets based on the plurality of signature data;
   generating, by the at least one computing device, a filtered set of documents by removing first and second said documents from the plurality of documents that are not considered similar based on the similarity threshold;
   generating, by the at least one computing device, a plurality of partitions from the filtered set of documents based on inclusion in a respective disjoint set of data; and assigning, by the at least one computing device, the plurality of partitions to respective nodes of a plurality of computing devices to determine document similarity of respective ones of the filtered set of documents, to each other, within respective said partitions.

2. The method as described in claim 1, wherein the plurality of documents is configured as webpages, product descriptions, or social network communications.

3. The method as described in claim 1, further comprising extracting word data from each document of the plurality of documents and filtering the extracted word data to locate meaningful word data.

4. The method as described in claim 3, wherein the filtering of the extracted word data to locate meaningful word data includes removing word data included in a listing of rare or common word data.

5. The method as described in claim 1, wherein the input specifying the similarity threshold is a user input.

6. The method as described in claim 1, further comprising generating a recommendation by the at least one computing device based on the determination of similarity.

7. The method as described in claim 1, wherein the generating of the plurality of signatures is based at least in part on locality-sensitive hashing (LSH).

8. The method as described in claim 1, wherein the assigning includes applying a weight to an attribute described by words in respective ones of the plurality of documents.

9. The method as described in claim 8, wherein the applying of the weight includes adding additional instances of the words that describe the attribute to the respective ones of the plurality of documents based on the weight.

10. The method as described in claim 8, wherein the attribute and the weight are user specified via one or more inputs.

11. In a digital medium environment to determine document similarity, a method implemented by at least one computing device, the method comprising:
   receiving, by the at least one computing device, an input specifying a similarity threshold and a weight of an attribute, the similarity threshold defining a minimum number of a plurality of buckets that two documents of a plurality of documents are both to be included in to be considered similar;
   applying, by the at least one computing device, the weight to a word that corresponds to the attribute, the applying including adding additional instances of the word to the respective ones of the plurality of documents based on the weight;
   generating, by the at least one computing device using hashing, a plurality of signature data from the plurality of documents having the applied weighting;
   hashing, by the at least one computing device, the plurality of documents into respective ones of the plurality of buckets based on the plurality of signature data;
   generating, by the at least one computing device, a filtered set of documents by removing first and second said documents from the plurality of documents that are not considered similar based on the similarity threshold;
   generating, by the at least one computing device, a plurality of partitions from the filtered set of documents based on inclusion in a respective disjoint set of data; and
   assigning, by the at least one computing device, the plurality of partitions to respective nodes of a plurality of computing devices to determine document similarity of the filtered set of documents, to each other, within respective said partitions.

12. The method as described in claim 11, wherein the indication of the similarity threshold data and the weight are user specified.

13. In a digital medium environment to determine document similarity, a system comprising:
   a processing system; and
   a computer-readable storage medium having instructions stored thereon that, responsive to execution by the processing system, causes the processing system to perform operations comprising:
      receiving an input specifying a similarity threshold, the similarity threshold defining a minimum number of a plurality of buckets that two documents, of a plurality of documents, are to be included in to be considered similar;
      generating a plurality of signature data from the plurality of documents using hashing;
      hashing the plurality of documents into respective ones of the plurality of buckets based on the plurality of signature data;
      generating a filtered set of documents by removing first and second said documents from the plurality of documents that are not considered similar based on the similarity threshold;
      generating a plurality of partitions from the filtered set of documents based on inclusion in a respective disjoint set of data of a plurality of disjoint sets of data; and
      assigning the plurality of partitions to respective nodes of a plurality of computing devices to determine document similarity of respective ones of the filtered set of documents, to each other, within respective said partitions.

14. The system as described in claim 13, wherein the operations further comprising:
   extracting word data from each document of the plurality of documents; and
   filtering the extracted word data to locate meaningful word data.

15. The system as described in claim 14, wherein the filtering of the extracted word data to locate meaningful words includes removing word data included in a listing of rare or common word data.

16. The system as described in claim 14, wherein the generating includes applying a weight to an attribute described by word data in respective ones of the plurality of documents to control the determination of document similarity.

17. The system as described in claim 16, wherein the application of the weight includes adding additional instances of the word data that describe the attribute to the respective ones of the plurality of documents based on the weight.

18. The system as described in claim 16, wherein the attribute and the weight are user specified via one or more inputs.

19. The method as described in claim 11, further comprising generating a recommendation based on the determination of document similarity.

20. The system as described in claim 16, the operations further comprising generating a recommendation based on the determination of document similarity.

* * * * *